United States Patent [19]

Ackermann

[11] 4,450,482

[45] May 22, 1984

[54] DIGITAL REAL-TIME VIDEO IMAGE PROCESSING DEVICE

[75] Inventor: Rudolf Ackermann, Erlangen, Fed. Rep. of Germany

[73] Assignee: Siemens Aktiengesellschaft, Berlin and Munich, Fed. Rep. of Germany

[21] Appl. No.: 349,373

[22] Filed: Feb. 16, 1982

[30] Foreign Application Priority Data

Mar. 2, 1981 [DE] Fed. Rep. of Germany ....... 3107901

[51] Int. Cl.$^3$ .............................................. H04N 5/20
[52] U.S. Cl. .................................... 358/160; 358/164; 358/166
[58] Field of Search ................. 358/37, 160, 164, 166, 358/168, 169

[56] References Cited

U.S. PATENT DOCUMENTS 3,983,320 9/1976 Ketcham et al. .................... 358/166

OTHER PUBLICATIONS

SPIE/OSA, vol. 74 (1976), pp. 120-125, Ketcham, D. J., "Real-Time Image Enhancement Techniques".

Primary Examiner—John C. Martin
Assistant Examiner—Michael D. Parker
Attorney, Agent, or Firm—Hill, Van Santen, Steadman & Simpson

[57] ABSTRACT

An exemplary embodiment operates according to the principle of non-linear manipulation of the brightness distribution of video pictures by means of matching the brightness distribution (histogram) to a prescribed function F(H). An arithmetic unit with a histogram memory determines the histogram of a video image. A processing circuit is connected to the histogram memory and calculates correction values from the histogram for example during a vertical blanking interval so as to convert the current image point information into corrected image point information in accord with the prescribed function F(H), the corrected information being read into a correction memory. The image point information of a video image is supplied to the address input of the correction memory for conversion in accord with the correction values stored there.

5 Claims, 6 Drawing Figures

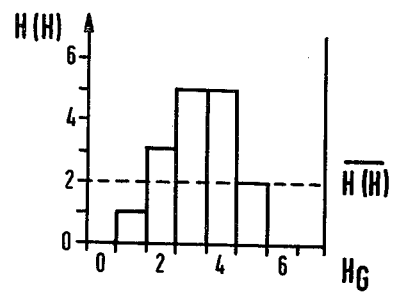
FIG 2
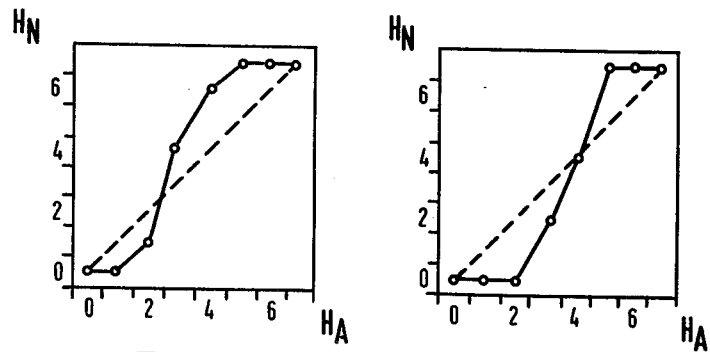
FIG 3
FIG 4
FIG 5
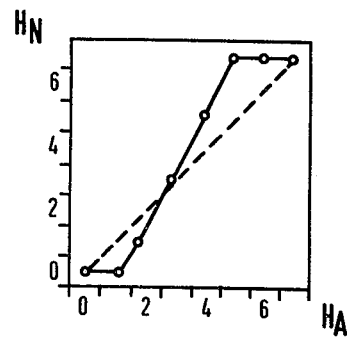
FIG 6

DIGITAL REAL-TIME VIDEO IMAGE PROCESSING DEVICE

BACKGROUND OF THE INVENTION

The invention relates to a digital real-time video image processing device according to the principle of non-linear manipulation of the brightness distribution of television pictures by means of matching the brightness distribution (histogram) to a prescribed function. Such image processing devices serve for improving the image contrast and, thus, the image quality.

The calculation of the allocation of gray scale values from the histogram is generally known from the literature. The reallocation of the brightness values is calculated by means of mathematical operations in a mass computer. This method is very involved and does not supply the enhanced images in real time.

A method is disclosed in the publication SPEI/OSA Vol. 74 (1976) "Image Processing", pages 120 through 125, in which the compensation of the histogram is directly gained by means of an electronic circuit. The only thing specified in the publication is the manner of functioning of this circuit and an indication of the manner of realizing such an arrangement is not given. The only thing shown is the required outlay for components and this is very extensive in this case.

The non-linear manipulation of the brightness distribution (histogram) of video images serves for enhancing the contrast. It is applied to every image point. A histogram indicates the frequency of the occurrence of brightness values of image points of a video image. A non-uniform distribution derives in most cases. New brightness values are computationally assigned to the individual brightness levels for the purpose of boosting contrast until a prescribed, for example, horizontal progression of the histogram derives. In so doing, the frequently occurring brightness stages appear spread, so that the contrast between these stages is increased. A spread of the used brightness can also thereby derive, since the brightness range is better exploited.

SUMMARY OF THE INVENTION

The invention proceeds from the task of creating an image processing device of the type initially cited which renders possible the realization of the non-linear manipulation of the brightness distribution for an overall television picture in real time in a simple manner and upon employment of only a few components, so that the quality of the pictures is significantly improved.

This object is inventively achieved in that an arithmetic unit with a histogram memory is present for determining the histogram of a video image, the address input of said arithmetic unit having the digitized image point information supplied to it; in that a processing circuit is connected to the histogram memory, said processing circuit calculating correction values from the histogram during the vertical trace unblanking for the conversion of the current image point information into corrected image point information which are read into a correction memory; and in that the image point information of a video image are also supplied to the address input of the correction memory for conversion in accord with the correction values stored there. By means of this processing device, the histogram is determined during a television image and the reallocation of the brightness values is determined during the vertical blanking, said reallocation being employed as correction values for the brightness levels for the reproduction of the next video image.

A simple format of the arithmetic unit is achieved when it exhibits an adder whose one input is connected to the output of the histogram memory and at whose second input the value 1 lies, and when the output of the adder is connected to the input of the histogram memory. The processing circuit can be expediently realized when it exhibits a second adder whose one input is connected via a changeover switch to the output of the histogram memory and whose output is connected to a register which is returned to the second input of the second adder, when the output signal of the second adder is also supplied to a comparator which, upon transgression of the function by said output signal, emits a counting pulse to a brightness level counter connected to it and controls the change-over in such manner that the input of the second adder is connected to a function generator for the negative value of the function and which supplies a counting pulse to an address counter and a write pulse to the correction memory when said output signal is smaller than or equal to the function; when the input of the correction memory is connected via a third adder to the brightness level counter; when the second input of the third adder is connected to a further change-over switch which is connected to the output of the correction memory in its one switching state and which is applied to zero in its other switching state; and when the output of the address counter can be connected to the address inputs of the memories.

A precise determination of the reallocation can be achieved when the calculation of the correction values ensues by means of averaging two individual calculations. A simple averaging is achieved when, for the first individual calculation, the counters are counted up by the counting pulses until they reach their maximum value which corresponds to the number of brightness states, and the further change-over switch is switched to zero; when, for the second individual calculation, the counters are counted back from their maximum value to zero and the change-over switch is connected to the output of the correction memory so that the two correction values of the individual calculations are summed in the third adder; and when a divider is connected at the output of the correction memory.

In the following, the invention is described in greater detail on the basis of an exemplary embodiment illustrated on the accompanying drawing sheets; and other objects, features, and advantages will be apparent from this detailed disclosure and from the appended claims.

BRIEF DESCRIPTION OF THE DRAWINGS

FIG. 2 shows the brightness of the image points of an exemplary image;

FIG. 3 shows the histogram of the exemplary image according to FIG. 2; and

FIGS. 4 through 6 show curves for determining the reallocation of image points.

DETAILED DESCRIPTION

Figure 1:
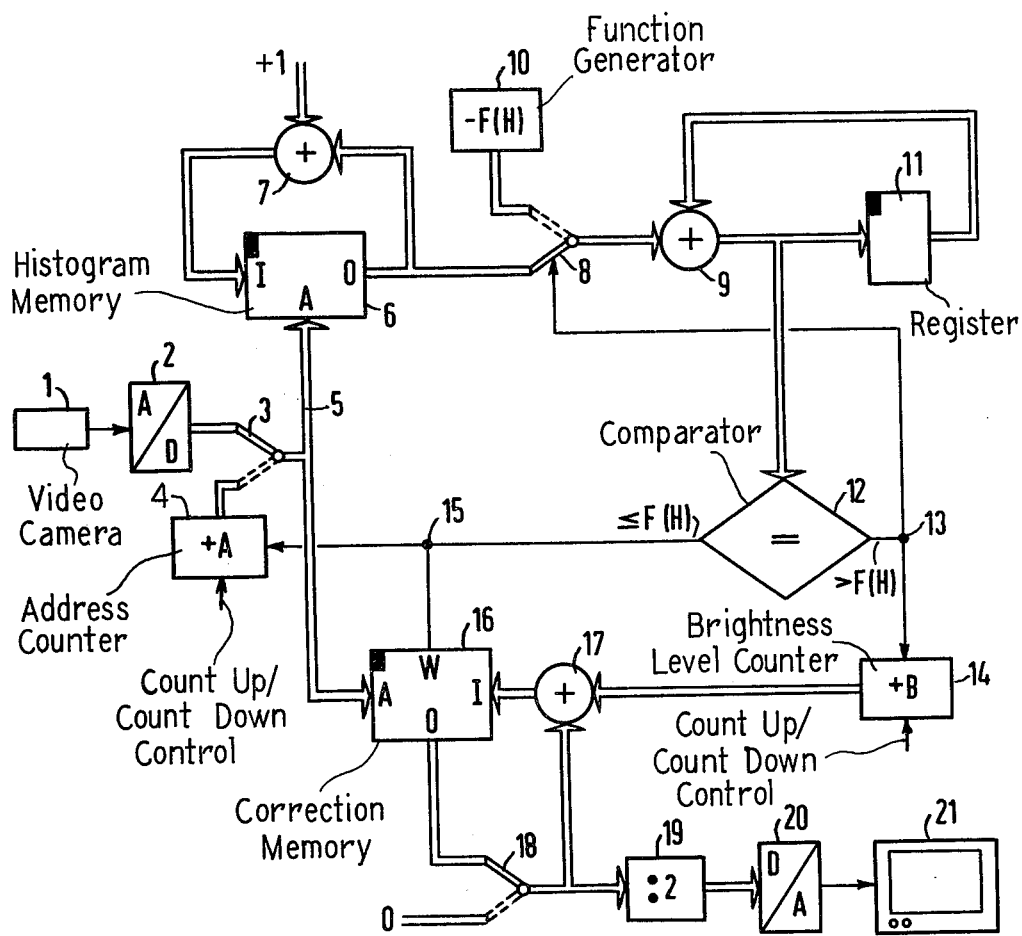
FIG. 1 shows the fundamental circuit diagram of an inventive image processing device.

An inventive image processing device is illustrated in FIG. 1 with a television camera 1 whose video signal is supplied to an analog-to-digital converter (A/D-converter) 2. The output of the A/D converter 2 is connected to one input terminal of an electronic changer-over switch 3 to whose other input terminal an address counter 4 is connected. The change-over switch 3 is connected via an address line 5 to the address input A of a histogram memory 6. The output signal at output O of the histogram memory 6 is supplied to an adder 7 at whose second input a plus one (+1) pends. The output of the adder 7 is connected to the input I of the histogram memory 6.

An electronic change-over switch 8 is also connected to the output O of the histogram memory 6, said change-over switch 8 being connected to a second adder 9. A function generator 10 which generates the negative function, −F(H), is connected to the second input terminal of the change-over switch 8. The output of the second adder 9 is connected to a register 11 whose output is returned to the input of the adder 9. Further, the output signal of the second adder 9 is supplied to a comparator 12 in which it is compared to the function F(H). When the output signal of the second adder exceeds the value of the function F(H), then the comparator 12 supplies a counting pulse to a brightness counter 14 via a clock line 13. Simultaneously, the change-over switch 8 is switched into the position indicated with broken lines, so that the function generator 10 is connected to the second adder 9.

When, in contrast thereto, the output signal of the second adder 9 is equal to or smaller than the function F(H), then, via a second clock line 15, a counting pulse is forwarded from the other output of the comparator 12 to the address counter 4 and a write pulse is forwarded to the write input W of a correction memory 16. The address input A of the correction memory 16 is likewise connected to the address line 5. The brightness level counter 14 is connected via an adder 17 to the input I of the correction memory 16. The output O of the correction memory 16 is connected to an input terminal of a further electronic change-over switch 18 whose other input terminal receives a zero level input. The changer-over switch 18 is connected to the adder 17 and to a divider 19 which is connected to a digital-to-analog converter (D-A Converter) 20. The output signal from converter 20 is supplied to a video monitor 21 on which the processed image is displayed.

First, the image processing device 2 through 20 calculates the histogram of the current video field. The television camera 1 supplies its video signal to the A-D converter 2 which digitizes the signals and supplies them to the histogram memory 6 as an address. The magnitude represented by the address indicates the brightness level of the image point. The information which has previously been stored at the memory location selected by the address is supplied from the output O to the adder 7 and is increased there by one. Simultaneously, the memory content increased by one is read into the histogram memory 6 at the same address. This procedure is repeated for each video point of the video signal from camera 1 until a complete video field is processed. In the memory locations of the histogram memory 6, which correspond to respective brightness levels of the video signal, the frequency of occurrence of the respective brightness levels is now contained, so that the complete histogram is stored in the histogram memory 6.

During the vertical blanking, the change-over switches 3 and 18 are switched into their positions indicated with broken lines. The correction values for the reallocation of the brightness levels or steps can now be determined. This operation is referred to below as rescaling.

The first counter 4 supplies the address for the histogram memory 6. The content of the memory location of the histogram memory 6 is supplied via the change-over switch 8 to the second adder 9. The content of the register 11 which is again read into the register 11 is added to this value. The addition (or: cumulative) value is further supplied to the comparator 12 in which it is compared to the function F(H). When the value is equal to or smaller than the function F(H), then a write pulse is forwarded to the write input W of the correction memory 16. The content of the brightness level counter 14 is read into the memory location which was selected by the output value of the address counter 4, being read in via the adder 17. Simultaneously, the counter reading of the address counter 4 is increased by one, so that the value of the next memory location stored in the histogram memory 6 can be read out. When, in contrast thereto, the sum of the contents of the histogram memory 6 and of the register 11 is greater than the function, then the counter reading of the brightness stage counter 14 is increased by one. Simultaneously, the change-over switch 8 is brought into its position indicated with broken lines, so that the function generator 10 is through-connected to the adder 9. Thus, the function F(H) is subtracted from the content of the register 11 and this difference is inscribed into the register 11. Simultaneously, the difference is again compared in the comparator 12 to the function F(H). This operation is repeated until the content of the register 11 is equal to or smaller than the function F(H). The new counter reading of the brightness level counter 14 is then read into the correction memory 16 and the counter reading of the address counter 4 is increased by one. All brightness levels or steps are processed in this manner.

Subsequently, the counters 4 and 14 are reversed by the supply of a logic one to respective control inputs such that they count down from their maximum value to zero. Simultaneously, the further change-over switch 18 is actuated, so that the output O of the correction memory 16 is through-connected to the adder 17. The same calculation of the reallocation of the brightness levels or steps, the rescaling, now ensues, only the brightness levels are this time interrogated proceeding from the top and the counter reading of the brightness level counter 14 read into the correction memory 16 is added to the correction value already calculated in the correction memory 16.

When the vertical blanking is terminated and the correction values are inscribed into the correction value memory 16, then the change-over switches 3 and 18 are placed in their illustrated (solid line) positions. Via the address line 5, the digitized output signal of the television camera 1 is now likewise supplied to the correction value memory 16 as an address, and the corresponding new brightness value supplied at its output O, (said new brightness value being supplied via the change-over switch 18, the divider 19 and the D-A converter 20 to the monitor 21) represents a video image point corrected in that manner for display on the monitor 21. This reallocation of the current video field calculated in the preceding video field ensues simultaneously with the determination of the new histogram in the arithmetic units 6 and 7.

The current video field, thus, is corrected with the values of the preceding video field. This reproduction can ensue fault-free only when the successive video fields exhibit the same brightness distribution. This precondition is precisely met given stationary video images. In the case of moving video scenes, whose image content generally changes only insignificantly in successive video fields, this correction is sufficiently precise so that no disruptive faults can occur.

If rapidly moving video scenes frequently occur, then an image memory can be provided which is connected to the A-D converter 2 and in which the video fields are intermediately stored. For the purpose of reproduction, the image point information contained in the image memory is supplied as addresses to the correction memory 16, so that the brightness levels of the video fields can be corrected with the rescaled values which were gained from the same field.

The function to which the histogram is matched can exhibit any desired progression or variation. Two function progressions have proven expedient. On the one hand, the function can effect an equal distribution of the brightness levels. In this case, it corresponds to a constant mean value which is formed from the number of image points divided by the number of brightness values. However, it can also exhibit a hyperbolic progression, whereby the lower brightness values occur more frequently than the high ones.

A clock generator (not illustrated) which synchronizes the memories 6, 16, the register 11, the function generator 10 and the counters 4, 14 belongs to the image processing device.

In order to explain the manner of functioning of the invention, the linear matching (or: adaptation) of the histogram of an exemplary image is shown below.

An image matrix with $m^2 = 4 \times 4$ image points is illustrated in FIG. 2. Each of the image points can assume one of eight brightness levels (0 through 7). In this image, however, only five levels exist, being identified by the numerals 1 through 5 entered for the image points.

In FIG. 3, the frequency of occurrence of the image points present in the exemplary image of FIG. 2 is entered for each of the brightness levels $H_G$. As can be seen, an accumulation of the existing plurality of brightness levels occurs for this example at the mean levels three and four.

The brightness levels zero, six and seven do not occur at all, so that the possible brightness range is not exploited.

This frequency distribution (histogram) is determined by the arithmetic units 6 and 7. To this end, the image points of FIG. 2 are successively scanned line-by-line by the television camera 1. The first image point (line one, column one, FIG. 2) exhibits a brightness of four. This value is supplied as an address to the histogram memory 6 which, since the memory previously stood at zero, reads a one into the corresponding memory location (four) via the adder 7 and the input I. The next image point (line one, column two, FIG. 2) corresponds to a brightness of three, so that a one is likewise read into the memory location three. At the next step, a one is likewise read into the memory location two. The last image point of the first line again exhibits a four so that the content of one is read out of the memory location (four) called in, is increased by one in the adder 7, and new value (two) is again read into the histogram memory 6. One proceeds in the same manner with the remaining lines, so that the complete histogram of the exemplary image illustrated in FIG. 3 is contained in the histogram memory 6 after conclusion of the calculation.

Subsequently, the rescaling of the histogram is carried out. For the sake of simplicity, the function F(H) with which the rescaling is to ensue shall be formed in the example by a constant which corresponds to the mean value $\overline{H(H)}$ of the histogram H(H) which mean value $\overline{H(H)}$ is indicated in FIG. 3 with broken lines. The mean value $\overline{H(H)}$ is formed by the number of image points $m^2$ divided by the number of brightness levels n:

$$\frac{m^2}{n} = 2$$

The mean value of the histogram parameters of the system is thus two, in this example. The counters 4 and 14 and the register 11 are reset to zero. The change-over switches 3 and 18 are placed in their positions illustrated with broken lines.

The stored values are successively read out from the histogram memory 6. Since the address counter 4 is set to zero, the address zero of the histogram memory 6 is called in, the value zero being situated therein. In the second adder 9, this is added to the value of the register 11, which is likewise zero in this case. Since the value is smaller than the function F(H), the counter reading of the brightness level counter 14, a zero, is read into the memory location zero of the correction memory 16 (selected by the address counter 4) via the third adder 17 at which a zero pends in this rescaling. Simultaneously, the reading of the address counter 4 is increased by one. This procedure now begins anew. The value in the memory location one of the histogram memory 6 (which is a one as shown in FIG. 3), is read out via the second adder 9 at which a zero from the register 11 still pends, is inscribed into the register 11, and is compared in the comparator 12 to the function F(H). Since the value still lies below the function F(H)=2, a zero is read into the memory location one of the correction memory 16 and the reading of the address counter 4 is increased by one to two.

Next, the value three of the memory location two of the histogram memory 6 arrives at the second adder 9, a one from the register 11 being adjacent to its other input. The sum of four is read into the register 11 and is compared in the comparator 12 to the function F(H). This time, the value is greater, so that the brightness level counter 14 receives a counting pulse and, thus, increases its reading to one. At the same time, the change-over switch 8 is actuated and the function generator 10 is connected to the second adder 9. In the second adder 9, the value (−2) of the function generator 10 is added to that of the register 11, a four, and the result is read into the register 11. Since the value supplied by the second adder 9 corresponds to the function F(H), a one is read into the memory location two of the correction memory 16 and the reading of the address counter 4 is increased to three. The entire histogram is read out in this manner and the values gained by means of the rescaling are read into the correction memory 16, so that the correction memory 16 contains the content illustrated in FIG. 4. The dependency of the new, rescaled brightness levels $H_N$ on the old brightness levels $H_A$ is entered in this figure.

Subsequently, the rescaling down ensues. The counters are reversed, so that they now count down. The register 11 is reset to zero and the readings of the counters 4 and 14 exhibit the value seven. The change over switch 18 is switched into the illustrated position.

Since the two upper brightness levels of the histogram exhibit a zero, the value seven of the brightness level counter 14 is added to the existing values of the correction memory 16 in the adder 17 and is again read into the correction memory 16. The value two of the memory location five of the histogram memory 6, which is equal to the function F(H) effects the addition of a seven in the appertaining memory location (five) of the correction memory 16, so that the respective values fourteen are contained now in the memory locations five through seven of the correction memory 16. The address counter 4 receives a further counting pulse, so that its reading is reduced to the value four.

Subsequently, the content of the histogram memory 6, a five, belonging to the address 4 is read out. In the second adder 9, the value five is added to the value of the register 11, a two, and is inscribed into the register 11. Since the sum is greater than the function F(H), the reading of the brightness level counter 14 is reduced by one and the function generator is connected to the second adder 9 by means of the change-over switch 8. By so doing, the value of the register 11 is reduced by two. Since this new value, a five, is still greater than the function F(H), this operation is repeated, so that the brightness level counter subsequently exhibits the value four which, since the value input to the comparator 12 has now been lowered to one, is summed up in the memory location four of the correction memory 16, to store a value of six plus four or ten.

This operation is repeated until both counters 4 and 14 are again at zero. The values illustrated in FIG. 5 have now been added to the content already contained in the correction memory 16, this being illustrated in FIG. 4, so that, after division in the divider 19, the values, partially rounded off to the whole number higher, illustrated in FIG. 6 derive. Thus, for a value $H_A$ of four, the value $H_N$ is ten divided by two, or five in FIG. 6.

Given subsequent image reproduction, the new brightness values supplied by the television camera 1 are supplied as addresses to the correction memory 16 which effects the allocation of the brightness levels. If the image were stationary in the example described, the first image point, for example, would be reproduced with a brightness of five (as shown in FIG. 6) instead of a brightness of four (as shown in FIG. 2). The second image point, with a brightness of three (as shown in FIG. 2), retains its brightness value, so that the contrast which results from the difference of the two brightness values has been increased by one. The remaining image points are processed in the same manner, so that an overall contrast enhancement derives which is characterized by the curve gained by means of the rescaling which has a steeper rise in comparison to the linearly rising curve illustrated with broken lines in FIG. 6.

It will be apparent that many modifications and variations may be effected without departing from the scope of the novel concepts and teachings of the present invention.

Supplemental Discussion

In FIG. 6 the straight dash line with a slope of forty-five degrees may be taken as representing the output from the divider component 19 where the values stored in the correction memory 16 are identical to the values shown in FIG. 2, but multiplied by two. In this case as the video camera 1 and converter 2 supplied the values of FIG. 2 (e.g., $H_A=4, 3 \ldots, 2, \ldots 4$ for the first row in FIG. 2), the output O of correction memory 16 would supply the corresponding doubled values (e.g., 8, 6, ..., 4, ... 8) and divider 19 would divide these values by two and supply the original values (e.g. 4, 3, ... 2, ..., 4) as shown in FIG. 2.

With the actual correction values $H_N$ as shown by the solid line curve in FIG. 6, input values at the address input A of correction memory 16 as shown in FIG. 2 (e.g. $H_A=4, 3, \ldots, 2, \ldots 4$, for the first row in FIG. 2) would result in readout values as shown at $H_N$, FIG. 6, but multiplied by two because of the double processing cycle of the processing circuitry 8 through 18 of FIG. 1, (e.g. doubled output values of 10, 6 ..., 2, ... 10 for the values of $H_A$ shown in the first row in FIG. 2). The corrected image point values corresponding to the input values of FIG. 2, as supplied by divider component 19, FIG. 1, would then be as shown by the following table, the greater contrast range being apparent from comparing the original values of FIG. 2 with the corresponding values in the Table:

|     | Corrected Image Point Information Based on the Corrected Values of FIG. 6 | | | |
| --- | --- | --- | --- | --- |
|     | (1) | (2) |   | (m) |
| (1) | 5   | 3   | 1 | 5   |
| (2) | 5   | 1   | 0 | 3   |
|     | 5   | 3   | 1 | 5   |
| (m) | 7   | 3   | 3 | 7   |

It will be noted that the input value ($H_A$) of three is in effect multiplied by one to obtain an output value ($H_N$) of three, while an input value of five is in effect multiplied by 1.4 to obtain an output value of seven. This is termed a non-linear manipulation of the input brightness distribution since different input values are in effect multiplied by substantially different factors so as to increase contrast.

Operation of FIG. 1 with a Hyperbolic Function F(H)

(1) Assume for purposes of a simplified example that the hyperbolic function can be approximated by values of 0, 1, 1, 1, 2, 2, 3, 6 for respective brightness levels of 0, 1, 2, 3, 4, 5, 6, 7. The mean value of the hyperbolic function has to be 2 again.

(2) As before, the histogram memory 6 may store the values as shown in FIG. 3.

(3) With counters 4 and 14 at a count value of zero, a zero is read from memory 6. The corresponding histogram output of zero (FIG. 3) ist compared to a value of function F(H) of zero, to actuate the left hand output of comparator 12, and store a zero correction value at location zero of memory 16.

(4) With counter 4 at a count value of one, a value of one is read from memory 6. The value of the function is still zero, because the count value of counter 14 ist still zero. The right hand output of comparator 12 is active, to increase the count value of counter 14. With a count of one at counter 14, the value of F(H) is one, and the left hand output of comparator 12 ist active to store a one at location one of memory 16. The register 11 stores a value one to be added in a subsequent cycle.

(5) With a count of two at counter 4, the histogram value (FIG. 3) from memory 6 is three. The register 11 receives a value three plus one or four in an initial step.

The comparator 12 compares the value of four with the F(H) value of one. In a second step the F(H) value of one is subtracted from four, leaving a value three, and counter 14 is incremented to a value two. In a third step the value of three is compared with the F(H) value of one corresponding to the count of counter 14. In a fourth step the F(H) value of one is subtracted from three, leaving a value two, and counter 14 is incremented to a value three. In a next step the right hand output of comparator 12 is again active to subtract the F(H) value of one from the value of two stored in register 11. Counter 14 is incremented to a value four. In a sixth step the F(H) value of two is compared with the value of one stored in register 11. Thus a correction value four is stored in location two of memory 16.

(6) With a count of three at counter 4, the histogram value (FIG. 3) from memory 6 is five. With a count of four at counter 14, the value of F(H) is assumed to be two. A value five plus one or six is stored in the register 11 and is compared with the F(H) value. Thus the F(H) value of two is subtracted from six, leaving a value four, and counter 14 is incremented to a value five. The value of four from register 11 is greater than the F(H) value of two. Thus the F(H) value of two is subtracted from four, leaving a value two less to the next F(H) value of three. Thus a value six of counter 14 is stored in location three of memory 16, and register 11 ist left with a value of two.

(7) With a count of four at counter 4, the histogram value (FIG. 3) is five again. With a count of six at counter 14, the value of F(H) is three. A value five plus two or seven is stored in the register 11 and is compared with the F(H) value. Thus the F(H) value of three is subtracted from seven, leaving a value of four, and counter 14 is incremented to a value seven. The value of four from register 11 is less than the F(H) value of six. Thus the value of seven of counter 14 is stored in location four of memory 16, and register 11 is left with a value of four.

(8) With a count of five at counter 4, the histogram value (FIG. 3) is two. A value four plus two or six is stored in the register 11 equal to the F(H) value. Thus a rorrection value seven is stored in location five of memory 16.

(9) With a count of six and seven at counter 4, a zero is read from memory 6. Thus the correction value seven is stored in locations six and seven of memory 16.

Now correction values of 0, 1, 4, 6, 7, 7, 7, 7 for respective brightness levels of 0, 1, 2, 3, 4, 5, 6, 7 are stored in memory 16.

Subsequently, the rescaling down ensues. The counters are reversed, so that they now count down. The register 11 is reset to zero and the readings of the counters 4 and 14 exhibit the value seven. The change over switch 18 is switched into the illustrated position, to add the values of the counter 14 to the existing values of the correction memory 16.

After the rescaling down the correction values of 0, 2, 6, 10, 13, 14, 14, 14 for respective brightness levels of 0, 1, 2, 3, 4, 5, 6, 7 are stored in memory 16.

Given subsequent image reproduction, the new brightness values supplied by the television camera 1 are supplied as addresses to the correction memory 16 which effects the allocation of the brightness levels. If the image were again stationary in the example described, the corrected image point values corresponding to the imput values of FIG. 2, as supplied by divides component 19, FIG. 1, would then be as shown by the following table:

| | Corrected Image Point Information Based on the Corrected Values stored in Memory 16 | | | |
|---|---|---|---|---|
| | (1) | (2) | | (m) |
| (1) | 6 | 5 | 3 | 6 |
| (2) | 6 | 3 | 1 | 5 |
| | 6 | 5 | 3 | 6 |
| (m) | 7 | 5 | 5 | 7 |

I claim as my invention:

1. A digital real-time video image processing system according to the principle of non-linear manipulation of the brightness distribution of video pictures by means of matching the brightness distribution (histogram) to a prescribed function F(H), characterized in that an arithmetic unit with a histogram memory is provided for determining the histogram of a video image, said histogram memory having an address input for receiving digitized image point information and being operable for storing a set of histogram values based on said information; in that a processing circuit is connected to the histogram memory, said processing circuit calculating correction values from the stored histogram values for converting received image point information into corrected image point information in accord with the prescribed function F(H), said processing circuit including a correction memory for storing the corrected values, said correction memory having an address input, and means for supplying image point information of a video image to the address input of the correction memory for conversion in accord with the correction values stored there, characterized in that the prescribed function F(H) is a constant which corresponds to the mean value of the histogram parameters of the system.

2. A digital real-time video image processing system according to the principle of non-linear manipulation of the brightness distribution of video pictures by means of matching the brightness distribution (histogram) to a prescribed function F(H), characterized in that an arithmetic unit with a histogram memory is provided for determining the histogram of a video image, said histogram memory having an address input for receiving digitized image point information and being operable for storing a set of histogram values based on said information; in that a processing circuit is connected to the histogram memory, said processing circuit calculating correction values from the stored histogram values for converting received image point information into corrected image point information in accord with the prescribed function F(H), said processing circuit including a correction memory for storing the corrected values, said correction memory having an address input, and means for supplying image point information of a video image to the address input of the correction memory for conversion in accord with the correction values stored there, characterized in that the prescribed function F(H) exhibits a hyperbolic progression.

3. A digital real-time video image processing system according to the principle of non-linear manipulation of the brightness distribution of video pictures by means of matching the brightness distribution (histogram) to a prescribed function F(H), characterized in that an arithmetic unit with a histogram memory is provided for determining the histogram of a video image, said histogram memory having an address input for receiving digitized image point information and being operable for storing a set of histogram values based on said information; in that a processing circuit is connected to the histogram memory, said processing circuit calculating correction values from the stored histogram values for converting received image point information into corrected image point information in accord with the prescribed function F(H), said processing circuit including a correction memory for storing the corrected values, said correction memory having an address input, and means for supplying image point information of a video image to the address input of the correction memory for conversion in accord with the correction values stored there, characterized in that the processing circuit comprises a second adder a change-switch, a register, a comparator, a function generator for supplying a negative value of the prescribed function F(H), an address counter, a third adder, and a further change-over switch, said second adder having a first input connected via the change-over switch to the output of the histogram memory and having a second input connected to the output of the register and having an output connected to an input of the register; in that the output signal of the second adder is also supplied to the comparator, said comparator, when the function F(H) is transgressed, supplying a counting pulse in response to said output signal, a brightness level counter connected to the comparator for actuation by the counting pulse therefrom, said comparator controlling the change-over switch in such manner that the input of the second adder is connected to the function generator for receiving the negative value of the function F(H) when the function F(H) is transgressed, and said comparator supplying a counting pulse to the address counter and a write pulse to the correction memory when said output signal of said second adder is smaller than or equal to the function F(H); in that the input of the correction memory is connected via the third adder to the brightness level counter; in that said further change-over switch has a first input connected to the output of the correction memory and has a second input receiving a zero value; and has an output connected to said second input of the third adder; and means for connecting the output of the address counter to the address inputs of the histogram and correction memories.

4. An image processing system according to claim 3, characterized in that the calculation of the correction values ensues by means of averaging two individual calculations.

5. An image processing system according to claim 4, characterized in that, for the first individual calculation, the address and brightness level counters are counted up by the counting pulses to their maximum value which corresponds to the number of brightness levels, and the further change-over switch is switched to supply the zero value to said third adder in that, for the second individual calculation, the counters and counted down from their maximum value to zero and the further change-over switch connects the output of the correction memory with the third adder so that the two correction values of the individual calculations are summed in the third adder; and in that a divider is connected at the output of the correction memory.

* * * * *